(12) United States Patent
Salameh et al.

(10) Patent No.: US 10,360,017 B1
(45) Date of Patent: Jul. 23, 2019

(54) UPDATING PROGRAM PACKAGES AT DISTRIBUTION ENDPOINT

(71) Applicant: Microsoft Technology Licensing, LLC, Redmond, WA (US)

(72) Inventors: Jason Ghssane Salameh, Bothell, WA (US); Andy Liu, Redmond, WA (US); John James Vintzel, Redmond, WA (US); Cory Alan Hendrixson, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 3 days.

(21) Appl. No.: 15/860,574

(22) Filed: Jan. 2, 2018

(51) Int. Cl.
*G06F 8/65* (2018.01)

(52) U.S. Cl.
CPC ..................... *G06F 8/65* (2013.01)

(58) Field of Classification Search
CPC ..... G06F 8/60; G06F 8/61; G06F 8/65; G06F 8/658; G06F 8/70
USPC .................................................. 717/168–178
See application file for complete search history.

(56) References Cited

U.S. PATENT DOCUMENTS

| | | | | |
|---|---|---|---|---|
| 7,694,293 B2 * | 4/2010 | Rao | ............................ | G06F 8/65 713/191 |
| 8,719,812 B1 * | 5/2014 | Myers | ........................ | G06F 8/64 717/174 |
| 9,383,984 B2 * | 7/2016 | Mantripragada | ......... | G06F 8/60 |
| 9,454,363 B1 * | 9/2016 | Angell | ....................... | G06F 8/65 |
| 9,513,762 B1 * | 12/2016 | Hakim | .................. | G06F 3/0481 |
| 9,563,418 B1 * | 2/2017 | Walton | .................... | G06F 8/654 |
| 2004/0158546 A1 * | 8/2004 | Sobel | ......................... | G06F 8/60 |
| 2004/0215755 A1 * | 10/2004 | O'Neill | .................... | G06F 8/654 709/223 |
| 2005/0055686 A1 * | 3/2005 | Buban | ....................... | G06F 8/62 717/170 |
| 2005/0120106 A1 * | 6/2005 | Albertao | ................... | G06F 8/65 709/223 |
| 2005/0132356 A1 * | 6/2005 | Cross | ...................... | G06F 8/658 717/174 |
| 2006/0085860 A1 * | 4/2006 | Zou | ........................... | G06F 8/61 726/26 |
| 2006/0184932 A1 * | 8/2006 | Burnley | .................... | G06F 8/60 717/174 |
| 2007/0169073 A1 * | 7/2007 | O'Neill | .................... | G06F 8/61 717/168 |

(Continued)

*Primary Examiner* — Andrew M. Lyons
(74) *Attorney, Agent, or Firm* — Alleman Hall Creasman & Tuttle LLP (57) ABSTRACT

A computing system is provided that includes a distribution endpoint including one or more processors configured to receive a request from a developer computing device to update a program managed by the distribution endpoint, the program being previously packaged and signed. The one or more processors of the distribution endpoint are further configured to receive a code file including a change to the program, retrieve a package of the program that has not been updated with the change to the program, generate an updated package of the program by adding the code file to the retrieved package of the program such that the updated package of the program logically represents a package of the updated program, and distribute the updated package of the program to an end user computing device.

21 Claims, 6 Drawing Sheets

(56) References Cited

U.S. PATENT DOCUMENTS

| | | | |
|---|---|---|---|
| 2009/0083728 A1* | 3/2009 | Dennis | G06F 8/658 717/174 |
| 2009/0260004 A1* | 10/2009 | Datta | G06F 8/65 717/175 |
| 2010/0281475 A1* | 11/2010 | Jain | G06F 8/658 717/172 |
| 2011/0119653 A1* | 5/2011 | Culpepper | G06F 8/60 717/120 |
| 2011/0321028 A1* | 12/2011 | Evans | G06F 8/61 717/170 |
| 2013/0054682 A1* | 2/2013 | Malik | G06F 8/60 709/203 |
| 2013/0067449 A1* | 3/2013 | Sannidhanam | G06F 8/60 717/170 |
| 2013/0185563 A1* | 7/2013 | Djabarov | G06F 8/654 713/176 |
| 2013/0232229 A1* | 9/2013 | Firman | G06F 8/61 709/219 |
| 2013/0332916 A1* | 12/2013 | Chinn | G06F 8/65 717/169 |
| 2014/0007075 A1* | 1/2014 | Sporkert | G06F 8/68 717/173 |
| 2014/0189641 A1* | 7/2014 | Anderson | G06F 8/60 717/110 |
| 2014/0325497 A1* | 10/2014 | Zhao | G06F 8/65 717/169 |
| 2014/0357357 A1* | 12/2014 | Boyd | A63F 13/00 463/31 |
| 2015/0220318 A1* | 8/2015 | Mangaiahgari | G06F 8/62 717/169 |
| 2015/0370551 A1* | 12/2015 | Mahajan | G06F 8/43 717/170 |
| 2016/0357536 A1* | 12/2016 | Firlik | G06F 9/54 |
| 2017/0147324 A1* | 5/2017 | Weber | G06F 8/65 |
| 2018/0046395 A1* | 2/2018 | Sekimoto | G06F 3/0604 |
| 2018/0107525 A1* | 4/2018 | Govindaraju | G06F 8/60 |
| 2018/0275982 A1* | 9/2018 | Hunt | G06F 8/65 |
| 2018/0336026 A1* | 11/2018 | Park | G06F 9/445 |

* cited by examiner

UPDATING PROGRAM PACKAGES AT DISTRIBUTION ENDPOINT

BACKGROUND

Developers perform a packaging process on their applications to make guarantees about the state of the application and its integrity. The complexity of the packaging process has adapted to meet increasingly complex scenarios needed to fit consumer and developer requirements, such as disjoint sets of packages that operate as a single unit allowing for code or content to be created and distributed separately from the application.

SUMMARY

A computing system is provided that may include a distribution endpoint including one or more processors configured to receive a request from a developer computing device to update a program managed by the distribution endpoint, the program being previously packaged and signed. The one or more processors of the distribution endpoint may be further configured to receive a code file including a change to the program, retrieve a package of the program that has not been updated with the change to the program, generate an updated package of the program by adding the code file to the retrieved package of the program such that the updated package of the program logically represents a package of the updated program, and distribute the updated package of the program to an end user computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
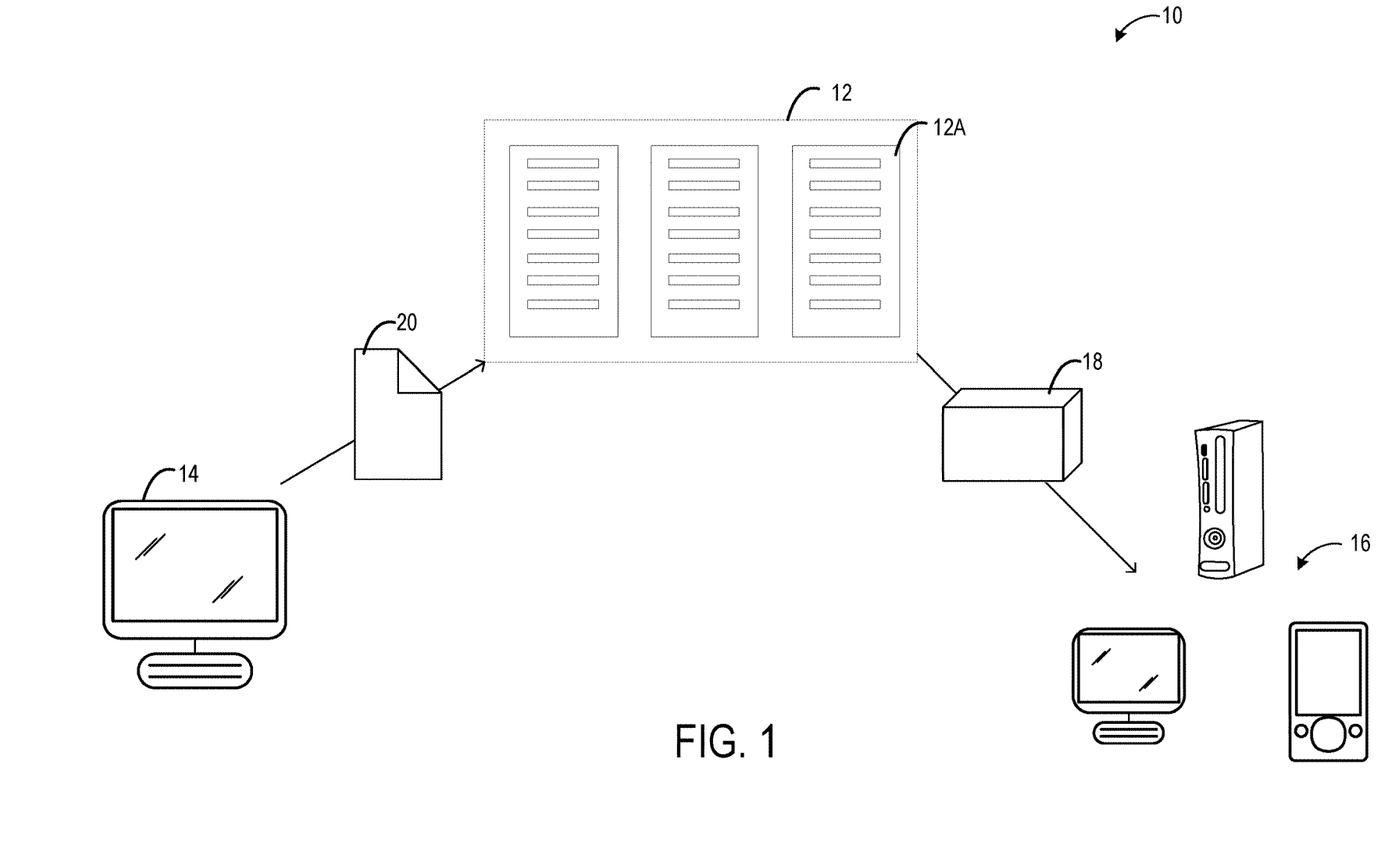
FIG. 1 is a schematic view of a computing system including a distribution endpoint, a developer computing device, and one or more end user devices, according to one implementation of the present disclosure.

FIG. 1 illustrates a schematic view of a computing system 10 that processes code files of a developer's changes to their program and a package of an older version of that program to generate an updated package of the program that may be deployed to end user devices. As shown, computing system 10 includes a distribution endpoint 12 configured to communicate with a developer computing device 14 and one or more end user computing devices 16 to deploy a package 18 of a program 20 to the one or more end user computing devices 16. In one example, the developer computing device 14 may take the form of a desktop computing device. However, it will be appreciated that the developer computing device 14 may take other forms, such as, for example, a tablet computing device, a mobile computing device, a laptop computing device, etc. Similarly, the end user computing devices 16 may take the form of a desktop computing device, a tablet computing device, a mobile computing device, a laptop computing device, a gaming console computing device, and/or another type of computing device.

In the illustrated example, the distribution endpoint 12 includes a plurality of server devices 12A that operate in a cloud computing configuration. However, it will be appreciated that the distribution endpoint 12 may take other forms, such as a single server device or a remote computing device configured to perform the processes and methods described herein. The distribution endpoint 12 stores and manages the package 18 of the program 20 for the developer computing device 14, such that changes to the program 20 may be received from the developer computing device 14 and utilized to update the package 18 of the program 20 stored on the distribution endpoint 12 without requiring the developer computing device 14 to reupload the entire updated program. The updated package may be made available to the one or more end user computing devices 16 via the distribution endpoint 12 or databases/servers associated with the distribution endpoint 12.

The program 20 may be created via a developer side application executed on the developer computing device 14. The developer side application may, for example, take the form of an integrated development environment (IDE) or another type of software development platform. After the developer has reached a version of the program 20 that the developer intends to make available to end users, that version of the program 20 may be packaged, signed, and deployed to the one or more end user devices 16 via the distribution endpoint 12.

Figure 2:
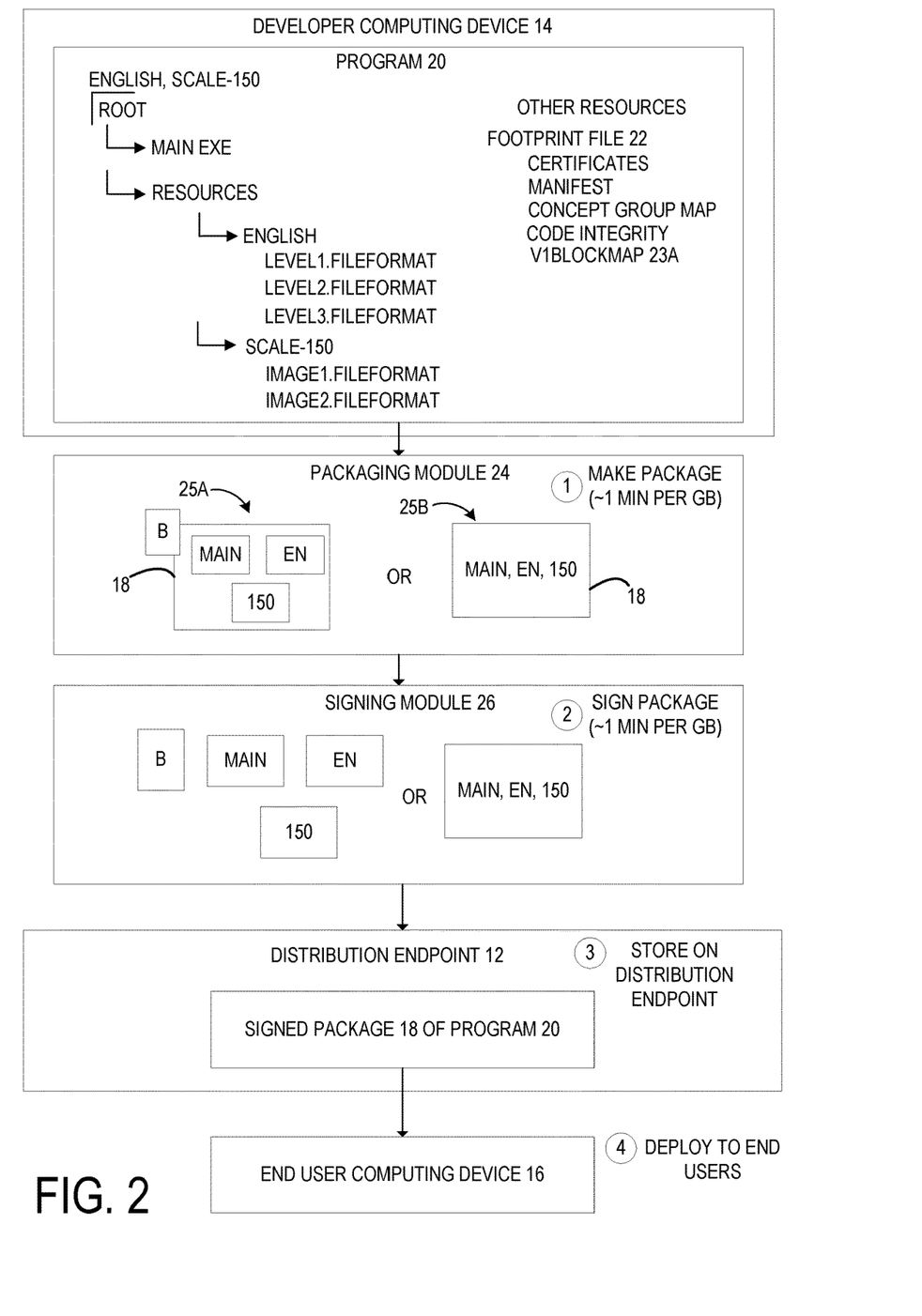
FIG. 2 shows a packaging and signing process using the computing system of FIG. 1.

FIG. 2 shows an example program 20 developed and stored on the developer computing device 14. In the illustrated example, the program 20 takes the form of a simple game, and includes a MAIN.EXE code file, an ENGLISH resources code file that includes several LEVEL.FILEFORMAT files, and a SCALE-150 code file that includes several IMAGE.FILEFORMAT files. The program 20 may also have other additional resources, such as a footprint file 22 that may include certificates, a manifest, a concept group map, a blockmap, code integrity files, and other types of files related to packaging and deploying the program 20. For example, the manifest may take the form of a document that contains information an end user computing device may need to deploy, display, or update the program 20. This information may include package identity, package dependencies, required capabilities, etc. Typically, the manifest is digitally signed during a signing process of the package 18 of the program 20. After the manifest has been digitally signed, the manifest typically cannot be modified without invalidating the package signature. The blockmap may take the form of a document that contains a list of the program 20 files along with indexes and cryptographic hashes for each block of data that is stored in the package 18 of the program 20. Typically, the manifest, the blockmap, code integrity files, and other packaging resources are generated during the packaging process, and are contained in the resulting package 18 of the program 20.

It will be appreciated that the example program 20 illustrated in FIG. 2 is merely exemplary, and that the types of programs and the content of program 20 that may be processed according to the methods described herein are not limited to the example program 20 of FIG. 2.

When the developer intends to make the example program 20 available to end users, the program 20 is put through a packaging and signing process which allows the developer side application and the distribution endpoint 12 to make certain guarantees about the state of the program 20 and its integrity. Thus, as shown in FIG. 2, the program 20 is sent to a packaging module 24. At step (1) the packaging module 24 may be configured to package the program 20 based on instructions included in the footprint file 22. For example, the footprint file 22 may indicate the developer's intent regarding whether the program 20 should be packaged in a package bundle format 25A that includes a plurality of subpackages, or as a monolithic package format 25B that includes all of the code files of the program 20 in a single package container. In another example, the footprint file 22 may convey the developer's intent for the code files of a loose directory structure of the program 20 (e.g. this code file is an asset, this code file is a resource, this code file should cost money and be deployed separately, etc.). In this example, the packaging module 24 may be configured to take in as input both the loose directory structure of the program 20 and the footprint file, and perform the packaging process on the program 20 based on the footprint file 22 to produce a package 18 of the program 20.

The packaging module 24 may be further configured to generate footprint file 22 including the manifest, code integrity files, and the V1BLOCKMAP 23A. As discussed previously, the V1BLOCKMAP 23A may contains a list of the program 20 files for this initial version of the program 20, as well as indexes and cryptographic hashes for each block of data that is stored in the package 18 of the program 20.

The package 18 of the program 20 is further processed by a signing module 26. At step (2) the signing module 26 may be configured to perform a signing process on the package 18 based on the package format. The signing module 26 may be configured to digitally sign the manifest included in the footprint file 22 of the package 18. For example, the package bundle format 25A includes a plurality of subpackages, and the signing module 26 may be configured to perform the signing process on each subpackage and the container B which contains and references the plurality of subpackages MAIN, EN, and 150. As another example, the monolithic package format 25B may only include a single package for all of the code files in the program 20. Thus, the signing module 26 may be configured to perform the signing process on the entire monolithic package of program 20.

It will be appreciated that the packaging module 24 and the signing module 26 may utilize any suitable packaging and signing methods. Typical packaging and signing methods may each take about one minute per gigabyte to process a program.

After the program 20 has been packaged and signed by the packaging module 24 and the signing module 26, the resulting package 18 of the program may be stored on the distribution endpoint 12. In some examples, the distribution endpoint 12 may perform other processes on the package 18 of the program 20, such as, for example, performing a validation process to ensure that the program 20 meets suitable quality standards. The package 18 of the program 20 may then be deployed to the one or more end user computing devices 16.

In one example, the packaging module 24 and the signing module 26 may be included in the developer side application executed on the developer computing device 14. In this example, the developer computing device 14 may package and sign the program 20, and upload the complete package 18 of the program 20 to the distribution endpoint 12. In another example, the packaging module 24 and the signing module 26 may be included in software executed by one or more processors of the distribution endpoint 12. In this example, the developer computing device 14 may be configured to upload a loose directory of code files of the program 20, and a footprint file 22 that indicates how the developer intends the program 20 to be packaged. After receiving the loose directory of code files of the program 20 and the footprint file 22, one or more processors of the distribution endpoint 12 may be configured to package and sign the program 20 for the developer based on the footprint file 22.

On typical software development and deployment platforms, to deploy a new version of the program 20 to the end user computing devices 16, the developer computing device 14 must upload the entire updated program 20 to the distribution endpoint 12 even though only a portion of the program 20 may have been changed.

Figure 3:
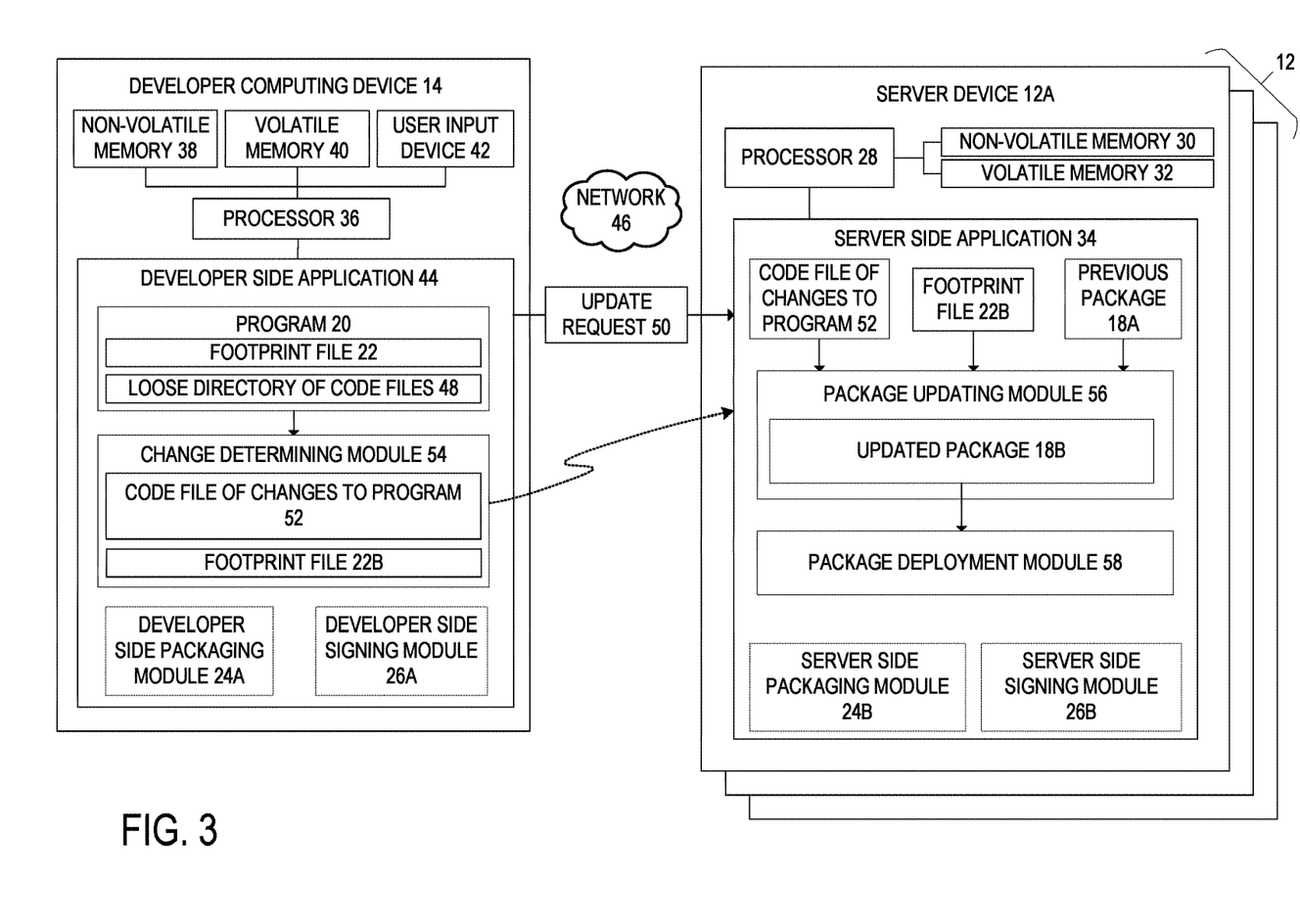
FIG. 3 is a schematic view of the distribution endpoint and developer computing device of FIG. 1.

FIG. 3 illustrates a schematic view of the developer computing device 14 and the distribution endpoint 12 that processes code files of a developer's changes to their program and a package of an older version of that program to generate an updated package of the program that may be deployed to end user devices. As shown, the distribution endpoint 12 may include a plurality of server devices 12A, each server device including a processor 28, non-volatile memory 30, volatile memory 32, and other suitable computing components. As shown, one or more processors 28 of the server devices 12A of the distribution endpoint 12 are configured to execute instructions for a server side application 34 of a software development and deployment platform.

Similarly, the developer computing device 14 may also include a processor 36, non-volatile memory 38, volatile memory 40, user input device 42 and other suitable computing components. As shown, the processor 36 of the developer computing device 14 is configured to execute instructions for a developer side application 44 of the software development and deployment platform. The developer side application 44 is configured to communicate with the server side application 34 over a network 46, which, for example, may be a wide area network.

As discussed previously, the developer side application 44 may take the form of an IDE, and provides software tools to develop the program 20. To deploy the program 20 to end users, the program 20 may be packaged and signed according to the processes and methods described regarding FIG. 2. In one example, the developer side application 44 may include a developer side packaging module 24A and a developer side signing module 26A, and may be configured to package and sign the program 20 before uploading the resulting package 18 of the program 20 to the distribution endpoint 12 over the network 46.

In another example, the server side application 34 may include a server side packaging module 24B and a server side signing module 26B, and may be configured to package and sign the program 20 for the developer of the developer computing device 14. In this example, the developer side application 44 may be configured to upload, to the distribution endpoint 12, a loose directory of code files 48 of the program 20 and a footprint file 22 that includes instructions regarding how the program 20 is to be packaged.

After the program 20 has been packaged, signed, and validated, the package 18 of the program 20 may be stored on the distribution endpoint 12 and/or a database or other server associated with the distribution endpoint 12. The stored package 18 of the program 20 may then be deployed to one or more end user computing devices 16.

As discussed previously, the developer of the program 20 may continue to update and make changes to code files of the program 20. After the developer of the has updated the program 20 to a new version that the developer intends to deploy to the end users, the developer computing device 14 may be configured to send a request 50 to the distribution endpoint 12 to update the package 18 of the program 20. In turn, the one or more processors 28 of the plurality of server devices 12A of the distribution endpoint 12 may be configured to receive the request 50 from the developer computing device 14 to update the program 20 managed by the distribution endpoint 12, the program 20 being previously packaged and signed. As discussed previously, in one example, the program 20 is previously packaged and signed by the developer side application 44 executed on the developer computing device 14. In another example, the program is previously packaged and signed by the distribution endpoint 12 based on code files 48 of the program 20 received from the developer computing device 14. In either example, after the program 20 has been packaged, signed, and stored on the distribution endpoint 12, the package 18 of the program 20 may be subsequently updated in response to the request 50 received from the developer computing device 14.

Alongside or subsequently to the request 50, the server side application 34 executed by the one or more processors 28 of the distribution endpoint 12 may be further configured to receive a code file 52 including a change to the program 20. The code file 52 may include one or more code files that contain the code changes to the program 20 since the last update to the package 18 of the program 20 managed by the distribution endpoint 12. In one example, the code file 52 may be a loose code file that is unpackaged and unsigned. The distribution endpoint 12 may be configured to perform other verification processes to guarantee that the code file 52 was sent by the developer computing device 14. In another example, the code file 52 may be packaged and signed by the developer side application 44 executed on the developer computing device 14 before being sent to the distribution endpoint 12 to provide guarantees for the code integrity and authenticity of the code file 52.

In one example, the change to the program 20 is determined by the developer side application 44 executed on the developer computing device 14. As illustrated in FIG. 3, the developer side application 44 may further include a change determining module 54 configured to track each change made to the code of the program 20. The developer may continue to make iterative changes to the program 20 including compiling and testing those changes, until the developer has reached an updated version of the program 20 that the developer intends to deploy to the end user computing devices 16. Next, the change determining module 54 of the developer side application 44 may be configured to determine a code difference between the updated version of the program 20 and the previous version of the program 20, and generate the code file 52 of changes to the program 52 based on the determined code difference.

In one example, the developer side application 44 may be configured to package the updated program including generating a new blockmap for the package of the updated program. The blockmap may contain a list of files for the updated version of the program 20, as well as indexes and cryptographic hashes for each block of data that is stored in the new package for the updated program. To determine the code difference between the previous version and the updated version of the program 20, the change determining module 54 may be configured to compare the updated blockmap of the updated program package to the previous blockmap of the previous program package. In particular, the change determining module 54 may, block-by-block, compare the cryptographic hash determined for each file. If the cryptographic hash value is different for a particular block between the updated and previous blockmaps, then the change determining module 54 may determine that the associated file of program 20 has been changed. Thus, the change determining module 54 may be configured to select that particular file of the updated program to be uploaded to the distribution endpoint 12. In this manner, each code file that has been changed since the previous iteration of program 20 may be detected by the change determining module 54 and uploaded to the distribution endpoint 12 as the code file 52 of changes to the program 20.

The change determining module 54 is further configured to generate a footprint file 22B that tracks the change to the program 20 in addition to the code file 52 of changes to the program 20. The footprint file 22B may indicate which code files of the program 20 were changed, and/or indicate how the code changes affect the program 20. Particularly, the footprint file 22B may be generated to include the updated blockmap for the updated program package discussed above.

In one example, the footprint file 22B is programmatically generated by the change determining module 54 of the developer side application 44. That is, the change determining module 54 may be configured to track which code files of the program 20 have been changed by the developer, and programmatically generate the footprint file 22B to include metadata indicating which code files of the program 20 have been updated and/or the updated blockmap.

In another example, the footprint file 22B is generated via user input. The developer computing device 14 may be configured to received user input via the user input device 42, which, for example, may take the form of a mouse and keyboard. In particular, the developer side application 44 may be configured to allow the developer to author the footprint file 22B via user input to the user input device 42. Through the footprint file 22B, the developer may indicate which code files of the program 20 are being updated in this new version of the program 20. The developer side application 44 may generate the footprint file 22B based on the user input received by the user input device 42 according to standards expected by the distribution endpoint 12. In either example, after the footprint file 22B has been generated, the developer side application 44 may be configured to send the footprint file 22B to the distribution endpoint 12 with the code file 52 of the changes to the program 20.

As illustrated in FIG. 3, the one or more processors 28 of the distribution endpoint 12 are configured to receive the code file 52 of the changes to the program 20 and the footprint file 22B from the developer computing device 14. Next, the server side application 34 executed by the one or more processors 28 may be configured to retrieve a package 18A of the program 20 that has not been updated with the change to the program. That is, the server side application 34 retrieves the previous package 18A of the program 20 that is stored on the distribution endpoint 12 or an associated database or server.

As illustrated, a package updating module 56 of the server side application 34 is configured to take as input, the code file 52 of the changes to the program 52, the previous package 18A of the program 20 that has not yet been updated, and the footprint file 22B. The package updating module 56 is configured to generate an updated package 18B of the program 20 based on the code file 52 of the changes to the program 20, the previous package 18A of the program 20, and the footprint file 22B. In particular, the package updating module 56 may be configured to generate the updated package 18B of the program 20 by adding the code file 52 to the retrieved package 18A of the program 20 such that the updated package 18B of the program 20 logically represents a package of the updated program. That is, the updated package 18B logically represents the updated version of the program 20 that has been packaged according to the methods described above.

In one example, to add the code file 52 to the retrieved package 18A of the program 20, the package updating module 56 may be configured to add the code file 52 to the retrieved package 18A of the program without repackaging the program 20. For example, the package updating module 56 may determine which code files within the previous package 18A were changed during the update based on the footprint file 22B. The package updating module 56 may be configured to add the code file 52 of the changes to the program 20 to the retrieved package 18A of the program 20, and modify metadata of the retrieved package 18A to reference the added code file 52 as well as instructions on deploying the package with the added code file 52 of the changes to the program 20 such that a package management system on the end user computing devices 16 may appropriately install the updated version of program 20 via the updated package 18B. In this manner, the package updating module 56 may update the previous package 18A to reflect the new changes to the program 20 without rebuilding the entire package.

In one specific example, the package updating module 56 may be configured to extract a previous blockmap from the previous package 18A of the program 20, and an updated blockmap from the footprint file 22B received from the developer computing device 14. Next, the package updating module 56 may be configured to, block-by-block, compare the cryptographic hashes of the previous blockmap to the updated blockmap. Upon detecting a difference, the package updating module 56 may append an associated code file from the code file 52 of changes to the program 20 to the retrieved package (previous package) 18A, and update footprint files and metadata of the retrieved package (e.g. blockmap, manifest, etc.) to reference the appended code file. In this manner, each file in the code file 52 of changes to the program 20 is appended to the retrieved package 18A, and appropriately referenced/indexed by the updated footprint files and metadata (e.g. blockmap, manifest, etc.), to generate the updated package 18B which may be deployed on end user computing devices 16.

In another example, to add the code file to the retrieved package 18A of the program 20, the package updating module 56 may be configured to generate a new package for the updated version of the program 20. That is, the updated package 18B is a rebuilt package for the updated version of the program 20. To generate the new package, the package updating module 56 may be configured to identify one or more unchanged code files of the program from the retrieved package (previous package) 18A. The package updating module 56 may identify the one or more unchanged code files based on the footprint file 22B received from the developer computing device 14. In one specific example, the package updating module 56 may be configured to extract a previous blockmap from the previous package 18A of the program 20, and an updated blockmap from the footprint file 22B received from the developer computing device 14. Next, the package updating module 56 may be configured to, block-by-block, compare the cryptographic hashes of the previous blockmap to the updated blockmap. For each block that has matching hash values in both block maps, the package updating module 56 may determine that the code file associated with that block is unchanged. In this manner, the package updating module 56 may identify each code file in the retrieved package (previous package) 18A that was not changed in this update.

After identifying the one or more unchanged code files, the package updating module 56 may be configured to generate a new package that includes the one or more unchanged code files of the program identified from the retrieved package 18A and the code file 52 including the change to the program. That is, the package updating module 56 identifies and selects only the unchanged code files from the retrieved package 18A, and copies those unchanged code files into the new package alongside the code files 52 of the changes to the program 20 to generate the updated package 18B. In this manner, the updated package 18B does not include any out-of-date code files from the previous versions of the program 20. Lastly, the package updating module 56 may update the footprint files and metadata (e.g. manifest, blockmap, etc.) of the updated package 18B to appropriately reference/index the contained code files.

As illustrated in FIG. 3, after the updated packaged is generated by the package updating module 56, the updated package 18B may be sent to a package deployment module 58 which may be configured to distribute the updated package 18B of the program 20 to an end user computing device 16, or otherwise handle deployment of the updated package 18B to one or more of the end user computing devices 16. In one example, deploying the updated package 18B may include making the updated package 18B available for download from a download server. Deploying the updated package 18B may further include updating metadata on the download server that is readable by the one or more end user devices 16 to indicate that the program 20 has been updated by the developer and that an updated package 18B is available for download.

Figure 4:
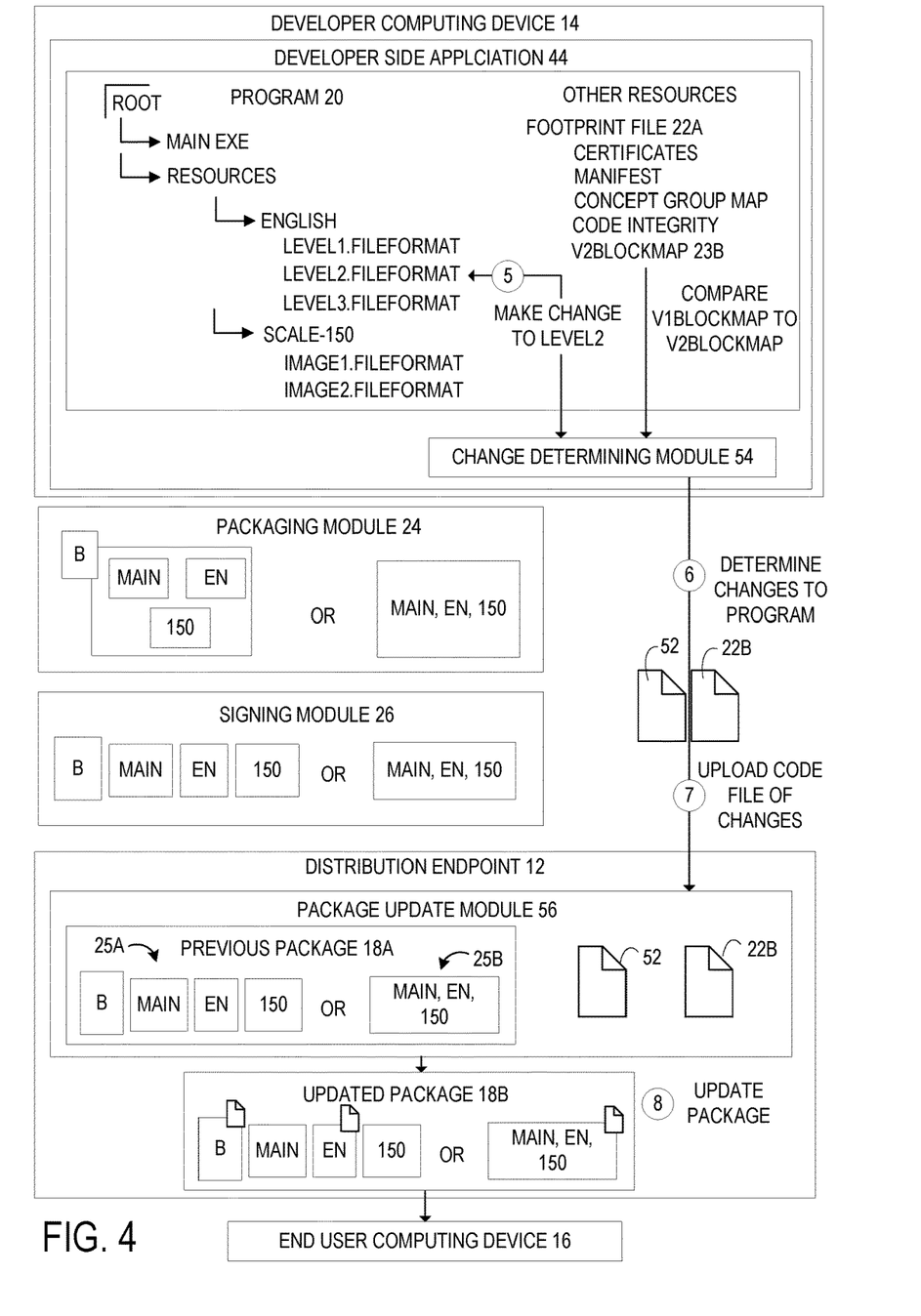
FIG. 4 shows a program updating process using the computing system of FIG. 1.

FIG. 4 shows the example program 20 of FIG. 2 being updated by the developer. In this example, at step (5), the developer makes a change to the LEVEL2.FILEFORMAT code file of the simple game of the example program 20. When the developer makes the change, the change determining module 54, at step (6), identifies the change and generates a code file 52 of the changes to the program 20 and a footprint file 22B as discussed regarding FIG. 3. In one specific example, the change determining module 54 may be configured to compare, block-by-block, the V2BLOCKMAP 23B of the updated footprint file 22A for the updated program to the previous V1BLOCKMAP 23A. Any differences between hash values for a particular block in the V2BLOCKMAP 23B and the V1BLOCKMAP 23A indicates that the associated code file for that particular block has been changed.

At step (7), the code file 52 of the changes to the program 20 and the footprint file 22B, which may include the V2BLOCKMAP 23B, are uploaded to the distribution endpoint 12. It will be appreciated that the total payload of the code file 52 and the footprint file 22B will typically be much smaller than the total size of the program 20, thus reducing the amount of data that is required to be uploaded to the distribution endpoint 12.

At step (8), the package updating module 56 updates a previous package 18A based on the code file 52 of the changes to the program 20 and the footprint file 22B. As illustrated, the package updating module 56 may be configured to update the previous package 18A differently depending upon the package format. In one example, the previous package 18A was packaged in a monolithic package format 25B, and the entire monolithic package is updated by the package updating module 56.

In another example, the previous package 18A was packaged in the package bundle format 25A that includes a plurality of subpackages. In the illustrated example, the plurality of subpackages include a container for the whole bundle B, a container for the MAIN.EXE, a container for the EN resources, and a container for the SCALE 150 resources. To update the previous package 18A in the package bundle format 25A, the package update module 56 may be configured to add the code file 52 to one or more of the plurality of subpackages based on the change to the program. In the illustrated example, the developer changed the LEVEL2.FILEFORMAT code file of the EN resources. Thus, based on the footprint file 22B which includes metadata that indicates the changes to the program 20, the package update module 56 adds the code file 52 to the subpackage container for the EN resources. The package update module 56 does not add the code file 52 to the MAIN.EXE subpackage container nor the SCALE 150 subpackage container, as no changes were made to code files within those containers in the illustrated example. Additionally, as one of the subpackages has been modified, the package update module 56 may be configured to also update the container for the whole package bundle B to reference the updated subpackage container for the EN resources.

After generating the updated package 18B according to the steps discussed above, the distribution endpoint 12 may be configured to distribute the updated package 18B to one or more end user computing devices 16.

In one example, the developer computing device 14 may be configured to distribute the package 18 of the program 20 rather than using the distribution endpoint 12. In this example, the developer side application 44 may be further configured to perform the functions of the server side application 34. That is, the developer side application 44 may further include the package updating module 56 and the package deployment module 58, and may be configured to perform their functions described above. The developer side application 44 may take the form of an IDE or other type of software development platform which provides tools for the developer to update their program 20. For example, the processor 36 of the developer computing device 14 may be configured receive an update to a program stored on the computing device, the program being previously packaged and signed. After the developer has made a change to the program 20 using the developer side application 44, the processor may determine a code file including a change to the program. The change to the program may be determined as the code difference between the current version of the program and the previous version of the program 20 that was packaged as the previous package. Next, the processor may retrieve the previous package of the program that has not been updated with the change to the program, and generate an updated package of the program without repackaging the program by adding the code file to the retrieved package of the program such that the updated package of the updated program logically represents a package of the updated program.

Figure 5:
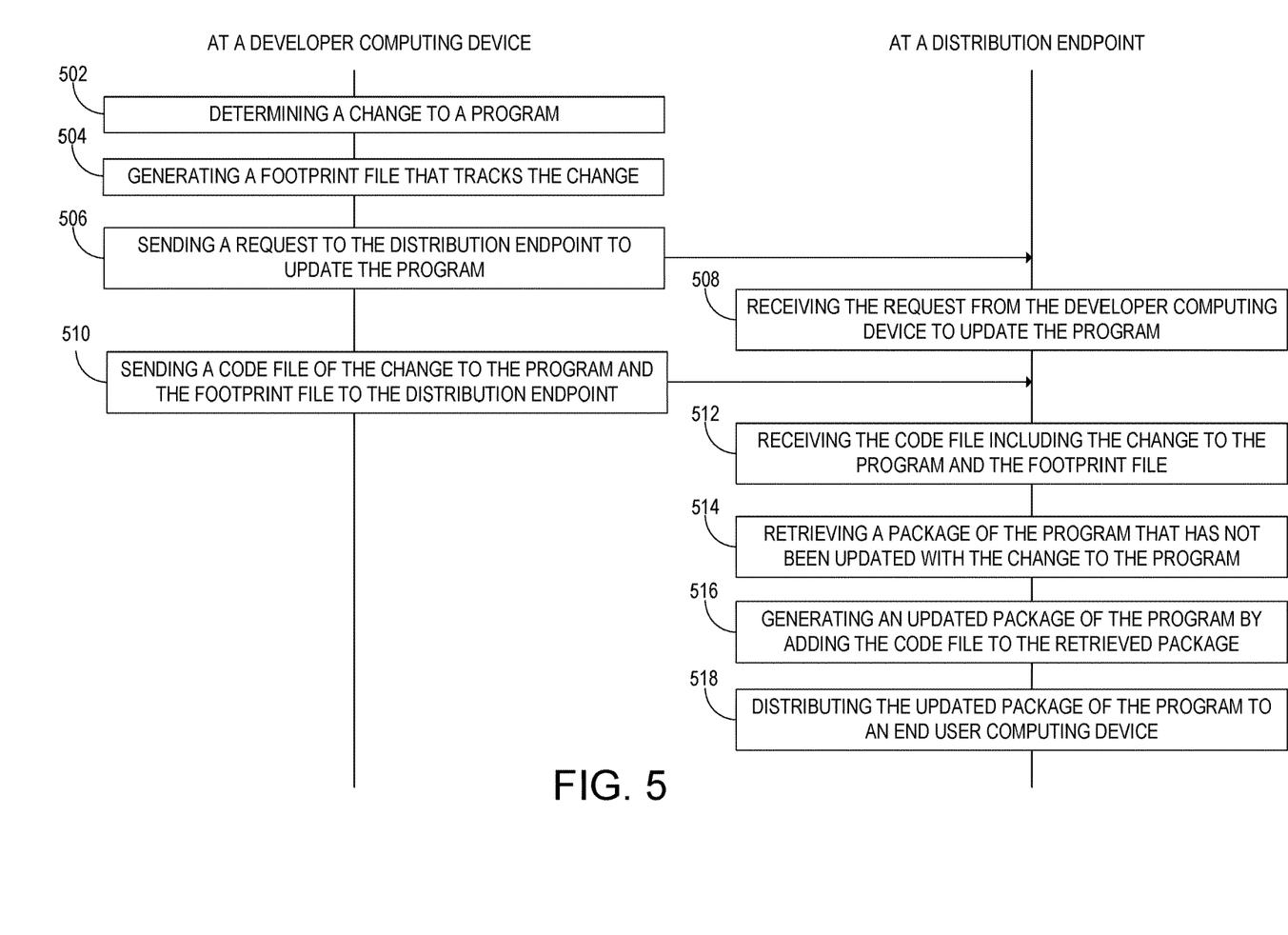
FIG. 5 is a flowchart illustrating a method for updating packages implemented by the computing system of FIG. 1.

FIG. 5 is a flowchart illustrating a method 500 for updating packages of an older version of a program, the method 500 implemented by the computing system of FIG. 1. At 502, the method 500 may include determining a change to a program, wherein the change to the program is determined by a developer side application executed on a developer computing device. In one example, the developer side application is an IDE or other type of software development platform that provides tools for the developer to make changes to a program. The developer side application may further include a change determining module which tracks each change the developer makes to the program. Once the developer has reached an updated version of the program that the developer intends to deploy, the change determining module of the developer side application may determine a code difference between the old version of the program and the updated version of the program.

At 504, the method 500 may include generating a footprint file that tracks the change to the program. In one example, the change determining module of the developer side application may be further configured to generate a footprint file that includes metadata indicating which code files of the program have been changed. In this example, the change determining module may programmatically generate the footprint file as the developer makes changes to the program. In another example, the developer side application may provide tools that allow the developer to author the footprint file to indicate which code files have been changed.

At 506, the method 500 may include sending a request to a distribution endpoint to update the program. At 508, the method 500 may include, at the distribution endpoint, receiving the request from the developer computing device to update a program managed by the distribution endpoint, the program being previously packaged and signed. In one example, the program may be previously packaged and signed by the developer side application executed on the developer computing device. That is, the developer computing device may have packaged and signed an initial version of the program, and uploaded the package to the distribution endpoint at a prior time. In another example, the program is previously packaged and signed by the distribution endpoint based on code files of the program received from the developer computing device. In this example, the developer computing device may be configured to upload a loose directory of code files of the program to the distribution endpoint along with a footprint file that conveys the developer's intent for each code file. The distribution endpoint may package and sign the program for the developer based on the loose directory of code files and the footprint file.

At 510, the method 500 may include, at the developer computing device, sending a code file of the change to the program and the footprint file to the distribution endpoint with the code file. At 512, the method 500 may include, at the distribution endpoint, receiving a code file including a change to the program. In one example, the code file may be a loose code file that is unpackaged and unsigned. In another example, the code file may be packaged and signed at the developer computing device before being uploaded to the distribution endpoint. At 512, the method 500 may further include receiving the footprint file.

At 514, the method 500 may include retrieving a package of the program that has not been updated with the change to the program. In one example, the server side application 34 executed on the distribution endpoint retrieves an older package of the previous version of the program that was previously packaged, signed, and stored on the distribution endpoint 12 or an associated database or server.

At 516, the method 500 may include generating an updated package of the program by adding the code file to the retrieved package of the program such that the updated package of the program logically represents a package of the updated program. In one example, the server side application 34 executed by the distribution endpoint is configured to take as input, the code file and footprint file received at 512, and the previous package of the program retrieved at 514, and generate an updated package of the program 20.

In one example, at 516, the method 500 may further include determining an updated version of the program that includes the code file, and generating a new package for the updated version of the program. To generate the new package, the method 500 may include identifying one or more unchanged code files of the program from the retrieved package (previous package) 18A. For example, the one or more unchanged code files may be identified based on the footprint file 22B received from the developer at step 508. In one specific example, the method 500 may include extracting a previous blockmap from the previous package 18A of the program 20, and an updating blockmap from the footprint file 22B received from the developer computing device 14. Next, the method 500 may include, block-by-block, comparing the cryptographic hashes of the previous blockmap to the updated blockmap. For each block that has matching hash values in both block maps, the code file associated with that block may be determined to be unchanged. In this manner, each code file in the retrieved package (previous package) 18A that was not changed in the update may be identified.

After identifying the one or more unchanged code files, at 516, the method 500 may further include generating a new package that includes the one or more unchanged code files of the program identified from the retrieved package 18A and the code file 52 including the change to the program. That is, the unchanged code files from the retrieved package 18A may be identified and selected, and copied into the new package alongside the code files 52 of the changes to the program 20 to generate the updated package 18B. In this manner, the updated package 18B does not include any out-of-date code files from the previous versions of the program 20. Lastly, at 516, the method 500 may include updating the footprint files and metadata (e.g. manifest, blockmap, etc.) of the updated package 18B to appropriately reference/index the contained code files.

In another example, at 516, the method 500 may include adding the code file to the retrieved package of the program without repackaging the program. For example, the package updating module 56 may determine which code files within the previous package 18A were changed during the update based on the footprint file 22B received at 512, and the method may include updating the previous package 18A retrieved at 514 to reflect the new changes to the program 20 without rebuilding the entire package.

At 518, the method 500 may include distributing the updated package of the program to an end user computing device. In one example, at 518, the method 500 may include making the updated package generated at 516 available for download from a download server. The distribution endpoint implementing 518 of method 500 may be configured to update metadata on the download server that is readable by the one or more end user devices 16 to indicate that the program 20 has been updated by the developer and that an updated package 18B is available for download.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
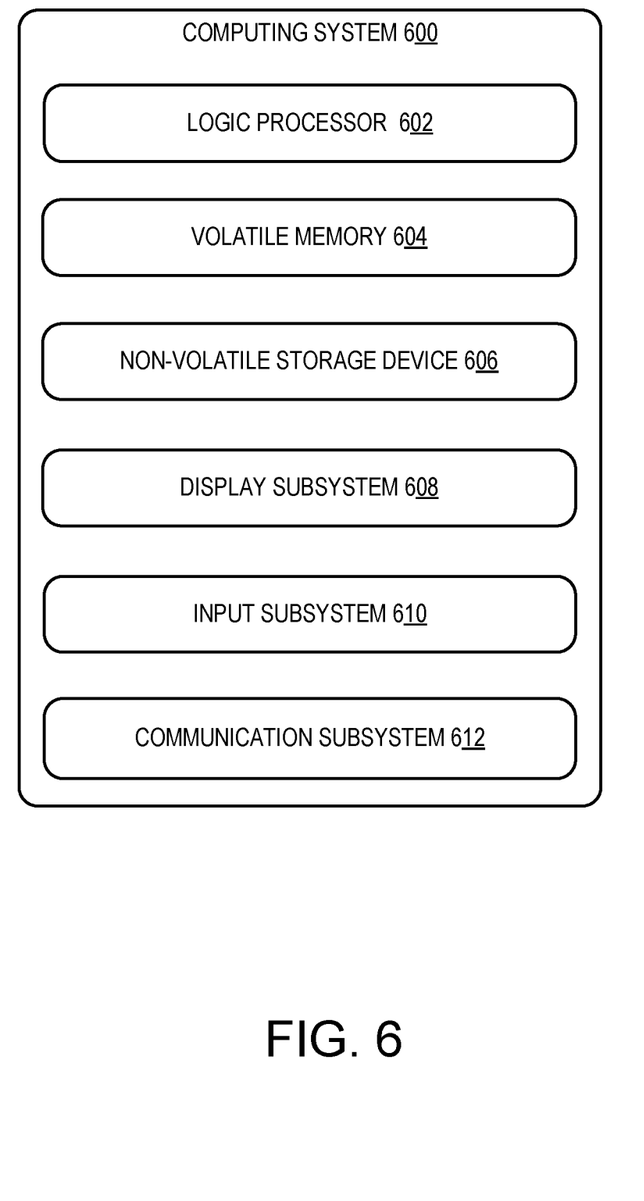
FIG. 6 is a schematic view of an example computing environment in which the computing system of FIG. 1 may be enacted.

FIG. 6 schematically shows a non-limiting embodiment of a computing system 600 that can enact one or more of the methods and processes described above. Computing system 600 is shown in simplified form. Computing system 600 may embody the computing system 10 described above, including the developer computing device 14 and the one or more server devices 12A of the distribution endpoint 12. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 6.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 604 may be transformed—e.g., to hold different data.

Non-volatile storage device 606 may include physical devices that are removable and/or built-in. Non-volatile storage device 604 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional support for the claims of the subject application. One aspect provides a computing system, comprising a distribution endpoint including one or more processors configured to receive a request from a developer computing device to update a program managed by the distribution endpoint, the program being previously packaged and signed, receive a code file including a change to the program, retrieve a package of the program that has not been updated with the change to the program, generate an updated package of the program by adding the code file to the retrieved package of the program such that the updated package of the program logically represents a package of the updated program, and distribute the updated package of the program to an end user computing device. In this aspect, additionally or alternatively, to add the code file to the retrieved package of the program, the one or more processors of the distribution endpoint may be further configured to identify one or more unchanged code files of the program from the retrieved package, and generate a new package that includes the one or more unchanged code files of the program identified from the retrieved package and the code file including the change to the program. In this aspect, additionally or alternatively, to add the code file to the retrieved package of the program, the one or more processors of the distribution endpoint may be further configured to add the code file to the retrieved package of the program without repackaging the program. In this aspect, additionally or alternatively, the retrieved package of the program may include a plurality of subpackages, and the one or more processors of the distribution endpoint may be configured to add the code file to one or more of the plurality of subpackages based on the change to the program. In this aspect, additionally or alternatively, the change to the program may be determined by a developer side application executed on the developer computing device. In this aspect, additionally or alternatively, the developer side application may be configured to generate a footprint file that tracks the change to the program, and send the footprint file to the distribution endpoint with the code file. In this aspect, additionally or alternatively, the footprint file may be programmatically generated by the developer side application. In this aspect, additionally or alternatively, the footprint file may be generated via user input. In this aspect, additionally or alternatively, the program may be previously packaged and signed by a developer side application executed on the developer computing device. In this aspect, additionally or alternatively, the program may be previously packaged and signed by the distribution endpoint based on code files of the program received from the developer computing device.

Another aspect provides a method comprising, at a processor of a distribution endpoint of a computing system, receiving a request from a developer computing device to update a program managed by the distribution endpoint, the program being previously packaged and signed, receiving a code file including a change to the program, retrieving a package of the program that has not been updated with the change to the program, generating an updated package of the program by adding the code file to the retrieved package of the program such that the updated package of the program logically represents a package of the updated program, and distributing the updated package of the program to an end user computing device. In this aspect, additionally or alternatively, adding the code file to the retrieved package of the program may further comprise identifying one or more unchanged code files of the program from the retrieved package, and generating a new package that includes the one or more unchanged code files of the program identified from the retrieved package and the code file including the change to the program. In this aspect, additionally or alternatively, adding the code file to the retrieved package of the program may further comprise adding the code file to the retrieved package of the program without repackaging the program. In this aspect, additionally or alternatively, the retrieved package of the program may include a plurality of subpackages, and the method may comprise adding the code file to one or more of the plurality of subpackages based on the change to the program. In this aspect, additionally or alternatively, the change to the program may be determined by a developer side application executed on the developer computing device. In this aspect, additionally or alternatively, the method may further comprise, at the developer side application, generating a footprint file that tracks the change to the program, and sending the footprint file to the distribution endpoint with the code file. In this aspect, additionally or alternatively, the footprint file may be programmatically generated by the developer side application. In this aspect, additionally or alternatively, the program may be previously packaged and signed by a developer side application executed on the developer computing device. In this aspect, additionally or alternatively, the program may be previously packaged and signed by the distribution endpoint based on code files of the program received from the developer computing device.

Another aspect provides a computing device comprising a processor configured to receive an update to a program stored on the computing device, the program being previously packaged and signed, determine a code file including a change to the program, retrieve a package of the program that has not been updated with the change to the program, and generate an updated package of the program without repackaging the program by adding the code file to the retrieved package of the program such that the updated package of the program logically represents a package of the updated program.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a distribution endpoint including one or more processors configured to:
receive a request from a developer computing device to update a program managed by the distribution endpoint, the program being previously packaged and signed;
receive a code file including a change to the program and a footprint file that tracks the change to the program from the developer computing device, the footprint file including an updated map of units of code in an updated version of the program and a hash value for each unit of code;
retrieve a package of the program that has not been updated with the change to the program;
generate an updated package of the program based on the footprint file by comparing hash values of each unit of code in the updated map to hash values of corresponding units of code in a previous map of units of code of the retrieved package to identify units of code that have changed in the updated version of the program and updating the identified units of code by adding the code file to the retrieved package of the program such that the updated package of the program logically represents a package of the updated program; and
distribute the updated package of the program to an end user computing device.

2. The computing system of claim 1, wherein to add the code file to the retrieved package of the program, the one or more processors of the distribution endpoint are further configured to:
identify one or more unchanged code files of the program from the retrieved package; and
generate a new package that includes the one or more unchanged code files of the program identified from the retrieved package and the code file including the change to the program.

3. The computing system of claim 1, wherein to add the code file to the retrieved package of the program, the one or more processors of the distribution endpoint are further configured to add the code file to the retrieved package of the program without repackaging the program.

4. The computing system of claim 1, wherein the retrieved package of the program includes a plurality of subpackages, and wherein the one or more processors of the distribution endpoint are configured to add the code file to one or more of the plurality of subpackages based on the change to the program.

5. The computing system of claim 1, wherein the change to the program is determined by a developer side application executed on the developer computing device.

6. The computing system of claim 5, wherein the developer side application is configured to generate the footprint file that tracks the change to the program, and send the footprint file to the distribution endpoint with the code file.

7. The computing system of claim 6, wherein the footprint file is programmatically generated by the developer side application.

8. The computing system of claim 6, wherein the footprint file is generated via user input.

9. The computing system of claim 1, wherein the program is previously packaged and signed by a developer side application executed on the developer computing device.

10. The computing system of claim 1, wherein the program is previously packaged and signed by the distribution endpoint based on code files of the program received from the developer computing device.

11. A method comprising:
at a processor of a distribution endpoint of a computing system:
receiving a request from a developer computing device to update a program managed by the distribution endpoint, the program being previously packaged and signed;
receiving a code file including a change to the program and a footprint file that tracks the change to the program from the developer computing device, the footprint file including an updated map of units of code in an updated version of the program and a hash value for each unit of code;
retrieving a package of the program that has not been updated with the change to the program;
generating an updated package of the program based on the footprint file by comparing hash values of each unit of code in the updated map to hash values of corresponding units of code in a previous map of units of code of the retrieved package to identify units of code that have changed in the updated version of the program and updating the identified units of code by adding the code file to the retrieved package of the program such that the updated package of the program logically represents a package of the updated program; and
distributing the updated package of the program to an end user computing device.

12. The method of claim 11, wherein adding the code file to the retrieved package of the program further comprises:
identifying one or more unchanged code files of the program from the retrieved package; and
generating a new package that includes the one or more unchanged code files of the program identified from the retrieved package and the code file including the change to the program.

13. The method of claim 11, wherein adding the code file to the retrieved package of the program further comprises adding the code file to the retrieved package of the program without repackaging the program.

14. The method of claim 11, wherein the retrieved package of the program includes a plurality of subpackages, and wherein the method comprises adding the code file to one or more of the plurality of subpackages based on the change to the program.

15. The method of claim 11, wherein the change to the program is determined by a developer side application executed on the developer computing device.

16. The method of claim 15, wherein the method further comprises, at the developer side application, generating the footprint file that tracks the change to the program, and sending the footprint file to the distribution endpoint with the code file.

17. The method of claim 16, wherein the footprint file is programmatically generated by the developer side application.

18. The method of claim 11, wherein the program is previously packaged and signed by a developer side application executed on the developer computing device.

19. The method of claim 11, wherein the program is previously packaged and signed by the distribution endpoint based on code files of the program received from the developer computing device.

20. A computing device comprising a processor configured to:
receive an update to a program stored on the computing device, the program being previously packaged and signed;
determine a code file including a change to the program and a footprint file that tracks the change to the program from the developer computing device, the footprint file including an updated map of units of code in an updated version of the program and a hash value for each unit of code;
retrieve a package of the program that has not been updated with the change to the program; and
generate an updated package of the program without repackaging the program based on the footprint file by comparing hash values of each unit of code in the updated map to hash values of corresponding units of code in a previous map of units of code of the retrieved package to identify units of code that have changed in the updated version of the program and updating the identified units of code by adding the code file to the retrieved package of the program and updating a manifest of the retrieved package to point to the added code file for the identified units of code such that the updated package of the program logically represents a package of the updated program.

21. The computing system of claim 1, wherein updating the identified units of code further includes updating a manifest of the retrieved package to point to the added code file for the identified units of code.

* * * * *